Sept. 20, 1938.                 C. V. JOHNSON                 2,130,885
                                 SHOCK STRUT
                              Filed June 12, 1935              2 Sheets-Sheet 2
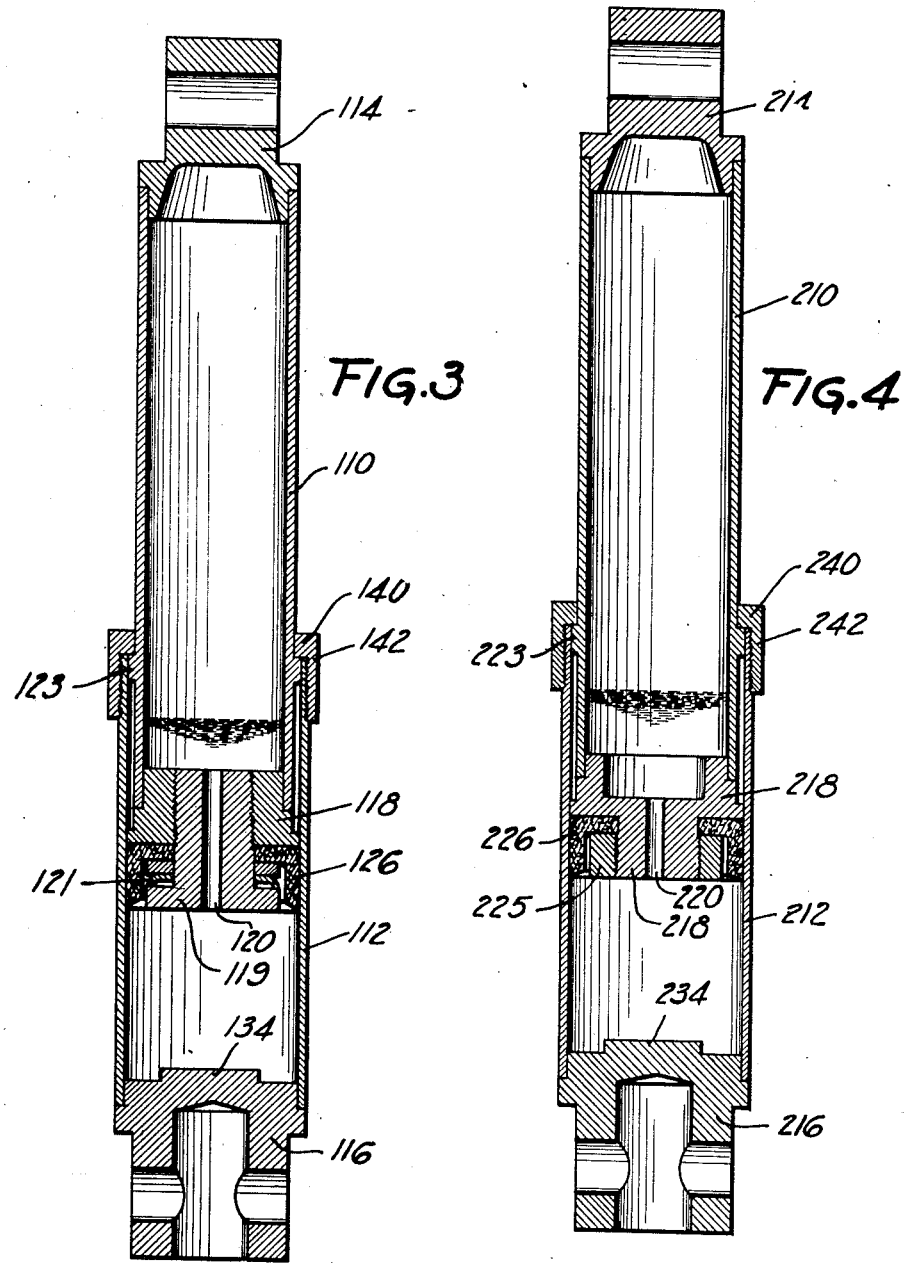
INVENTOR.
CARL V JOHNSON
BY  A. E. Wilson.
ATTORNEY Patented Sept. 20, 1938

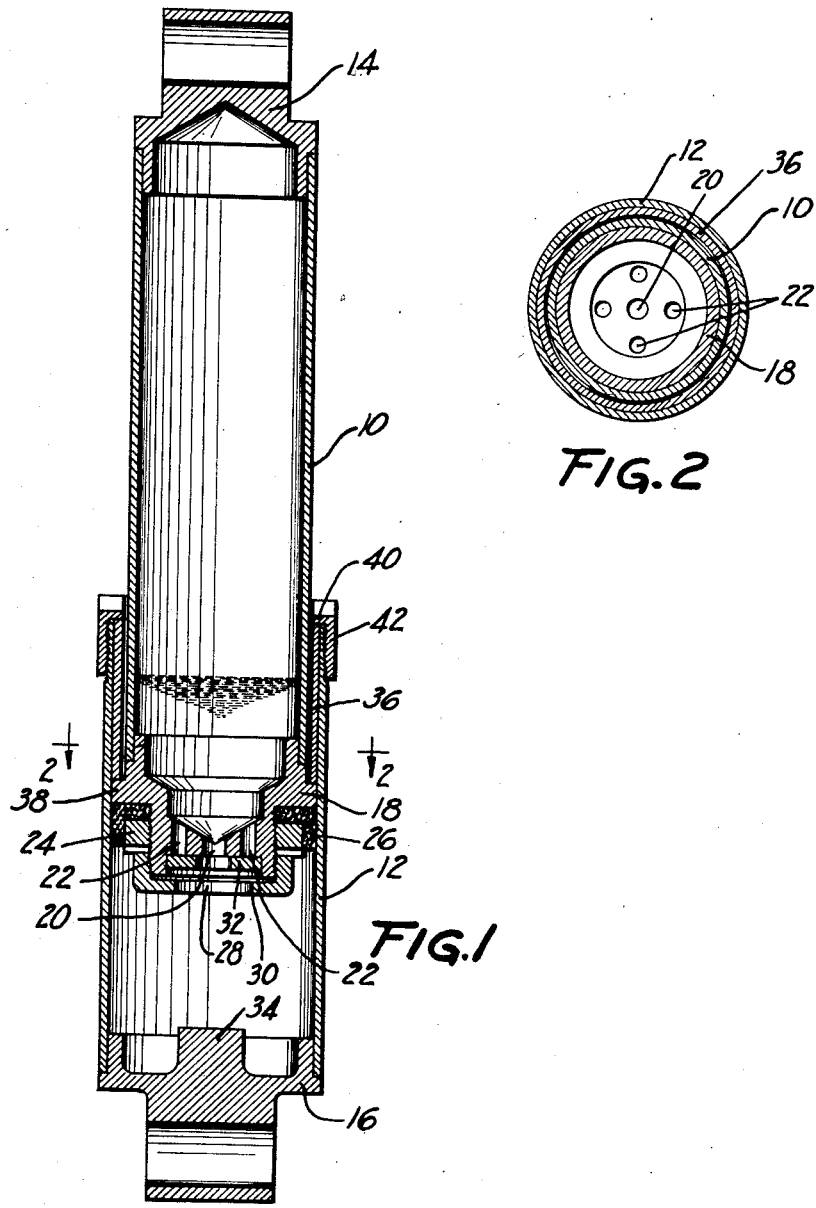

2,130,885

UNITED STATES PATENT OFFICE 2,130,885

SHOCK STRUT

Carl V. Johnson, South Bend, Ind., assignor to Bendix Products Corporation, South Bend, Ind., a corporation of Indiana Application June 12, 1935, Serial No. 26,146

2 Claims. (Cl. 267—64)

This invention relates to shock absorbing struts designed particularly for use with aircraft, but also adapted for use in other devices where it is desired to absorb impact loads.

In the smaller types of aircraft, it has been found impractical to employ shock absorbers of a conventional form, because of the complexity of the absorbing device, the increased weight, and the added cost of the structure. It has been common practice, therefore, to build such aircraft with rigid struts, depending on the resiliency of pneumatic tires to absorb the shocks of landing and taxying the craft on the ground. As a result of this, aircraft has been subjected to severe shocks and strains which resulted in damage to the craft and impaired the comfort of the occupants thereof.

An object of this invention is therefore to provide a simple shock absorber capable of absorbing high shock per unit weight of the strut.

A further object of the invention is to provide means for trapping a given quantity of air in a strut to move the strut to the fully expanded position when not subjected to load.

Another object of the invention is to provide a strut wherein a pressure is constantly exerted upon the strut sufficient to keep it fully expanded during maneuvers in the air.

Another object of the invention is to provide a shock absorbing strut wherein the shock is absorbed by exerting pressure on a fluid and forcing it through an orifice.

A still further object of the invention is to provide a strut wherein fluid is forced through a small orifice on the impact stroke, and through a plurality of orifices on the return stroke.

Yet a further object of the invention is to provide a strut which may be manufactured economically and in which the weight per unit of energy absorbing capacity is small.

Other objects and advantages of this invention will be apparent from the following detailed description, together with the accompanying drawings, submitted for purposes of illustration only and not intended to define the scope of the invention, reference being had for that purpose to the subjoined claims.

In the drawings, wherein similar reference characters refer to similar parts throughout the several views:

Figure 1 is a sectional view of a shock strut embodying the present invention;

Figure 2 is a view taken on the line 2—2 of Figure 1;

Figure 3 is a sectional view of a modified form of the invention; and

Figure 4 is a view similar to Figure 3 showing a still further modified form of the invention.

Referring more particularly to Figure 1, there is shown a shock absorbing strut including telescoping inner and outer cylinders 10 and 12 respectively. The inner cylinder 10 is provided with a fitting 14 adapted to engage the fuselage of the aircraft and to seal the upper end of the cylinder 10 in fluid tight relation. The outer cylinder 12 is provided with a fitting 16 adapted to engage the landing gear of the aircraft and to close the lower end of the cylinder 12 in fluid tight relation.

The lower end of the cylinder 10 is closed by a plunger 18. The plunger 18 is provided with a central orifice 20 and a plurality of auxiliary orifices 22. The lower portion of the plunger 18 is threaded to receive a retaining nut 24 which holds a washer 26 of rubber or other suitable resilient material. The washer 26 engages the inner surface of the cylinder 12 to form a fluid tight contact between the cylinders 10 and 12. The retaining nut 24 is locked in place by a locking nut 28 having a contracted outer section 30 designed to prevent a gravity actuated pressure responsive washer valve 32 from escaping. The valve 32 is so proportioned that when moved to the upper position it will close the auxiliary orifices 22.

The fitting 16, closing the lower end of the cylinder 12, is provided with a projection 34 adapted to slide through the contracted section 30 of the locking nut 28 to urge the washer valve 32 into engagement with the plunger 18 carried by the inner cylinder 10 to limit the downward movement of the inner cylinder 10.

A sleeve 36, interposed between the inner and outer cylinders 10 and 12, limits the upward movement of inner cylinder 10. The sleeve 36 engages a projection 38 carried by the plunger 18 at the lower end, and an inwardly disposed projection 40 carried by a locking sleeve 42 screwed onto the upper end of the outer cylinder 12.

It will be understood that the connection between the upper and lower ends of the cylinder 10, the fitting 14 and the plunger 18 respectively, as well as the connection between the lower end of the cylinder 12 and the fitting 16 may be a welded, shrunk, press fit, threaded connection or the parts may be secured together in fluid tight relation in any other desired manner.

The assembly of this device is as follows. A quantity of liquid such as oil of suitable viscosity is placed in the outer cylinder 12. The inner cylinder 10, having the plunger 18 fixed thereto, is then inserted into the upper end of the cylinder 12. The washer 26 engages the inner walls of the cylinder 12 in fluid tight relation, and prevents the escape of air and liquid. The sleeve 36 is then placed on the inner cylinder 10 and the cylinder forced downwardly, whereupon the liquid is compressed and forced to flow through the central orifice 20 of the plunger 18, into the inner cylinder 10 to compress the air contained therein. The threaded locking sleeve 42 is then tightened on the cylinder 12. The projection 40 engages the upper end of the sleeve 36 to prevent the cylinders 10 and 12 from becoming disassembled.

In operation when a shock is encountered, the cylinder 10 tends to telescope within the cylinder 12. The telescoping action is resisted by the liquid contained in the cylinder 12. A pressure is therefore exerted on the liquid which forces the washer valve 32 upwardly to close the auxiliary orifices 22 in the plunger 18. The liquid in the cylinder 12 then flows through the central orifice 20 into the upper cylinder 10 to absorb the shock.

As the liquid is transferred into the cylinder 10 from the cylinder 12, the air in the cylinder 10 is compressed. When the load is removed from the strut, the liquid pressure in the cylinders 10 and 12 becomes equalized, whereupon the valve 32 uncovers the auxiliary orifices 22, and the force of the compressed air in the cylinder 10 forces the liquid through both the central and the auxiliary orifices 20 and 22 respectively.

It thus appears that when the strut is subjected to shock or static load the fluid flows from the cylinder 12 into the cylinder 10 through a single orifice, and when the load is removed the fluid is forced by the pressure of the trapped air from the cylinder 10 into the cylinder 12 through a plurality of orifices. A quick return action is thus obtained, and sufficient air pressure is maintained in the cylinder 10 to hold the strut in the fully extended position at all times when not subjected to load. It will be understood that any desired pressure may be maintained above the oil by merely varying the dimensions of the respective parts of the strut, or by placing the oil in the upper cylinder 10 before the strut is assembled. If desired, a quantity of oil may be placed in both of the cylinders 10 and 12 to vary the pressure of the trapped air when the strut is assembled.

Figure 3 illustrates a modified form of the invention wherein the plunger 118, fixed to the cylinder 110, is provided with a threaded plug 119 having a central orifice 120. The washer 126 engages the inner walls of the outer cylinder 112 and is resiliently held in place between the plunger 118 and the plug 119 by means of "Belville" washers 121.

The telescoping movement of the inner cylinder 110 within the outer cylinder 112 is limited, in the downward direction, when the plug 119 engages the projection 134 carried by the fitting 116. The "Belville" washers 121 resiliently absorb the shock of impact when the respective parts engage each other. The upward movement of the inner cylinder 110 with respect to the outer cylinder 112 is limited by a skirt 123, carried by the inner cylinder 110, engaging the projection 140, carried by the locking sleeve 142.

The operation of this device is similar in many respects to the operation of the embodiment illustrated in Figure 1, air being compressed above the level of the oil in the inner cylinder 110 to force the oil through the orifice 120 when the strut is not subjected to load.

In the embodiment of the invention illustrated in Figure 4, the washer 226 is held between the plunger 218, fixed in the lower end of the inner cylinder 210, and a threaded plug 225 engaging the plunger 218.

The operation of this device is similar in many respects to the operation of the other embodiments. When the strut is subjected to load, the inner cylinder 210 moves downwardly within the outer cylinder 212, thereby exerting pressure on the oil in the cylinder 212 and forcing it through the central orifice 220 in the plunger 218. The air above the oil level in the inner cylinder 210 is thereby compressed, as the oil flows into the cylinder 210. When the load is removed, the pressure of the trapped air forces the oil from the cylinder 210, through the orifice 220 into the cylinder 212 to expand the strut, preparatory to the next cycle of operation.

While the invention has been described with particular reference to certain preferred embodiments, it is not intended to limit the scope of the invention to the embodiments described and illustrated, nor otherwise than by the terms of the following claims.

I claim:

1. A shock strut comprising telescoping inner and outer cylinders, fluid and liquid in the cylinders, a partial closure comprising a plunger having a plurality of apertures and an apertured member associated therewith for one end of the inner cylinder, pressure operated means interposed between the plunger and the apertured member to vary the rate of flow between the inner and outer cylinders dependent on whether the strut is being compressed or expanded.

2. In a shock strut a pair of telescoping cylinders, liquid and fluid in the cylinders, a head comprising a plurality of parts for one end of one of the cylinders, packing means engaged between two adjacent parts of the head and adapted to engage the walls of the outer cylinder, main and auxiliary orifices in one of the head parts, and a gravity actuated valve supported by another of the head parts and adapted to close the auxiliary orifices under certain operating conditions.

CARL V. JOHNSON.